Figure 2:
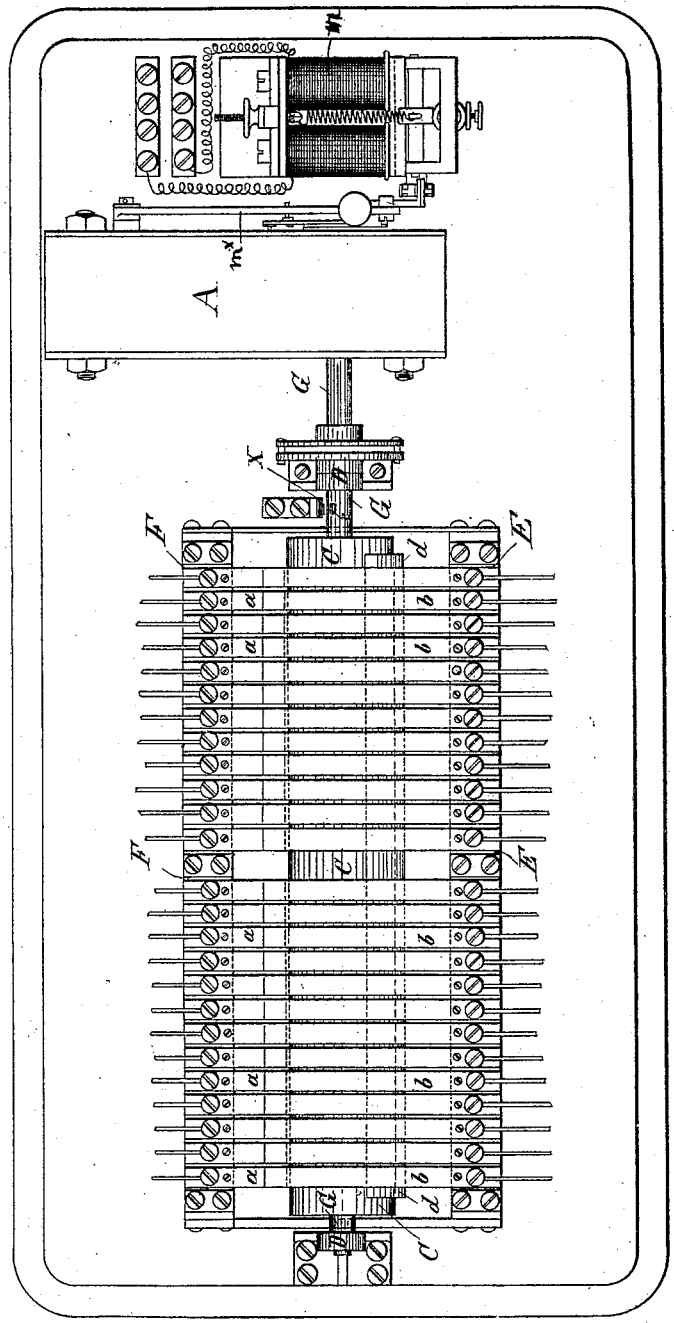

(No Model.) 5 Sheets—Sheet 1.
C. A. MAŸRHOFER.
ELECTRO MECHANICAL CENTRAL SYSTEM FOR REGULATING CLOCKS.
No. 443,291. Patented Dec. 23, 1890.
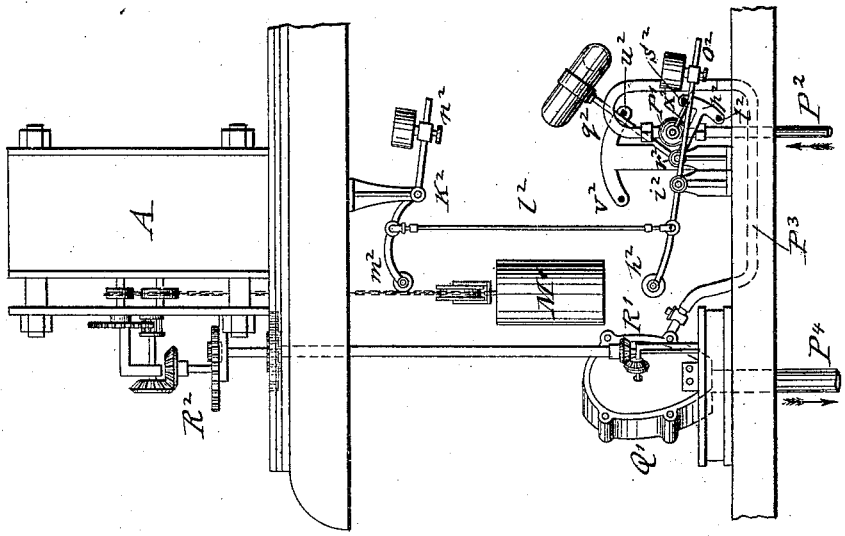
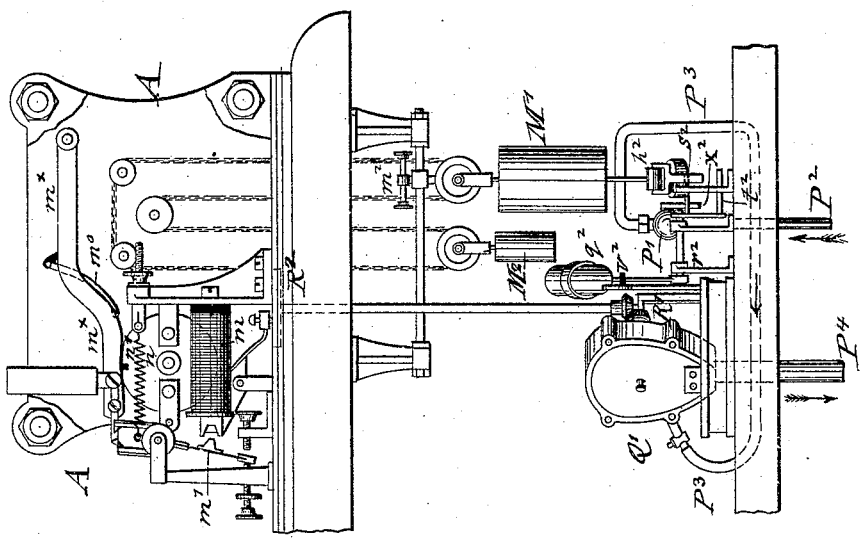
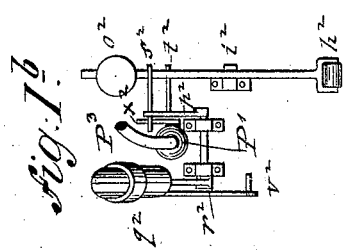
WITNESSES:
A. Schehl.
Martin Petry
INVENTOR
Carl Albert Mayrhofer
BY
Gorpel & Raegener
ATTORNEYS.

(No Model.) 5 Sheets—Sheet 2.

C. A. MAŸRHOFER.
ELECTRO MECHANICAL CENTRAL SYSTEM FOR REGULATING CLOCKS.

No. 443,291. Patented Dec. 23, 1890.

Witnesses:
Henry Huber
Carl Kapp

Inventor
Carl Albert Mayrhofer
by
Jacques Saegener
Attorneys (No Model.) 5 Sheets—Sheet 3.
C. A. MAYRHOFER.
ELECTRO MECHANICAL CENTRAL SYSTEM FOR REGULATING CLOCKS.
No. 443,291. Patented Dec. 23, 1890.
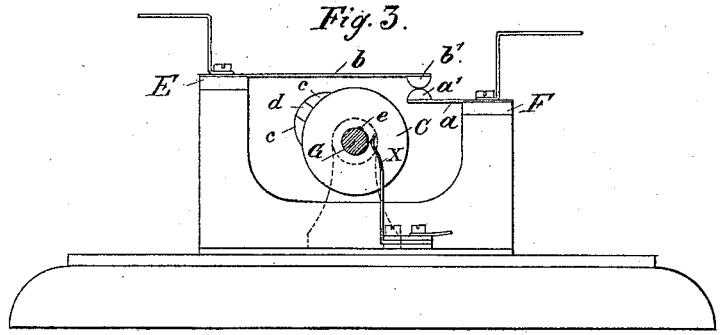
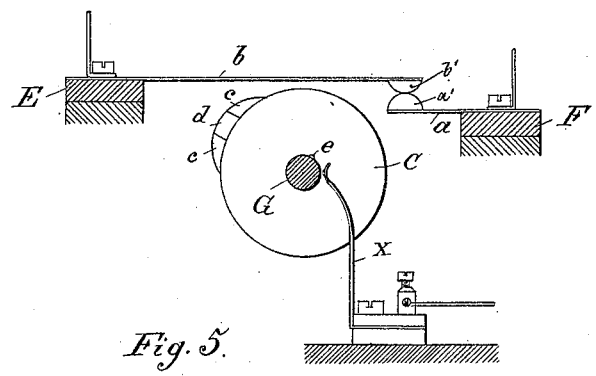
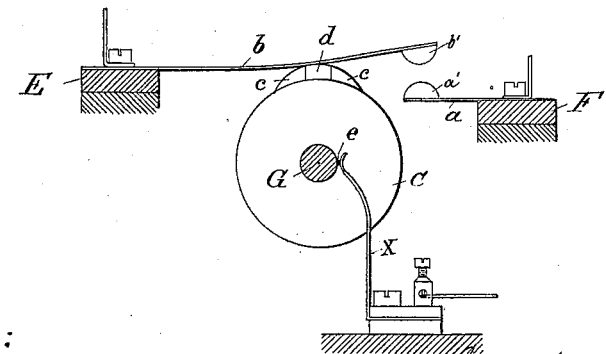

(No Model.) C. A. MAŸRHOFER. 5 Sheets—Sheet 4.
ELECTRO MECHANICAL CENTRAL SYSTEM FOR REGULATING CLOCKS.
No. 443,291. Patented Dec. 23, 1890.

Witnesses:
Henry Huber
Carl Karp

Inventor
Carl Albert Mayrhofer
by Goepel & Raegener
Attorneys (No Model.)  5 Sheets—Sheet 5.
C. A. MAŸRHOFER.
ELECTRO MECHANICAL CENTRAL SYSTEM FOR REGULATING CLOCKS.
No. 443,291. Patented Dec. 23, 1890.
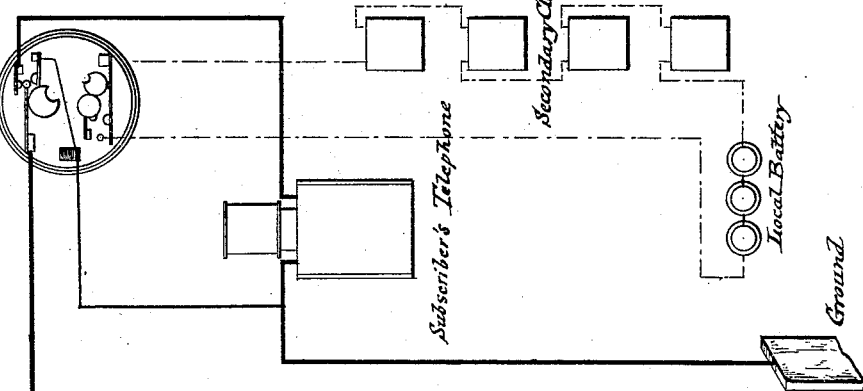
*Fig. 8.*
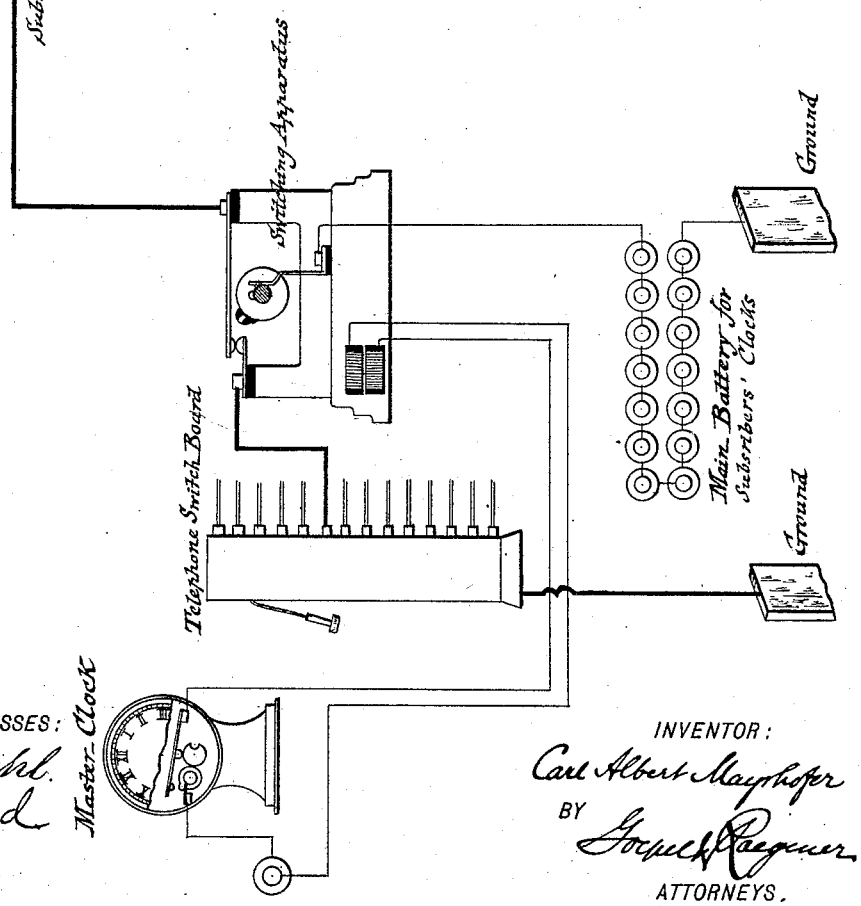
WITNESSES:
A. Schehl.
E. C. Steed
INVENTOR:
Carl Albert Maÿrhofer
BY
Goepel Raegener
ATTORNEYS.

UNITED STATES PATENT OFFICE.

CARL ALBERT MAŸRHOFER, OF BERLIN, GERMANY, ASSIGNOR, BY MESNE ASSIGNMENTS, TO THE ELECTRO-PNEUMATIC TIME COMPANY, OF NEW YORK, N. Y.

ELECTRO-MECHANICAL CENTRAL SYSTEM FOR REGULATING CLOCKS.

SPECIFICATION forming part of Letters Patent No. 443,291, dated December 23, 1890.

Application filed December 29, 1888. Serial No. 294,950. (No model.) Patented in Switzerland January 21, 1889, No. 115.

*To all whom it may concern:*

Be it known that I, CARL ALBERT MAŸRHOFER, a subject of the Emperor of Austria, residing at Berlin, in the Kingdom of Prussia, German Empire, have invented new and useful Improvements in Electro-Mechanical Central Systems for Regulating Clocks, (for which Letters Patent were granted to me in Switzerland, No. 115, dated January 21, 1889,) of which the following is a specification.

This invention relates to an improved system of setting the hands of a series of secondary clocks from a central station by electro-mechanical means. For this purpose any existing net-work of electric-line wires—such as telegraph, telephone, fire-alarm, or other wires—may be used, and at certain intervals of time electric impulses sent over the same to the clocks, while at the same time the telegraphic, telephonic, or fire-alarm instruments are switched out at the central station and clocks at the residences or offices of the subscribers switched in for producing the setting of the hands in an automatic, regular, and reliable manner.

The invention consists, first, of the combination, with a number of electric circuits, of a switching apparatus at the central station and a number of secondary clocks provided with switching devices for being switched into said circuits and with hand-setting devices that are operated when the switching devices are actuated.

The invention consists, secondly, in the construction of the switching apparatus and the motor for operating the same.

The invention consists, thirdly, in the construction of the hand-setting and switching devices applied to all the clocks in the different circuits, and, lastly, of an auxiliary mechanism by which each clock may be used as a central or master clock for other electrically or electro-mechanically operated clocks, as will be fully described hereinafter, and finally pointed out in the claims.

Figure 6:
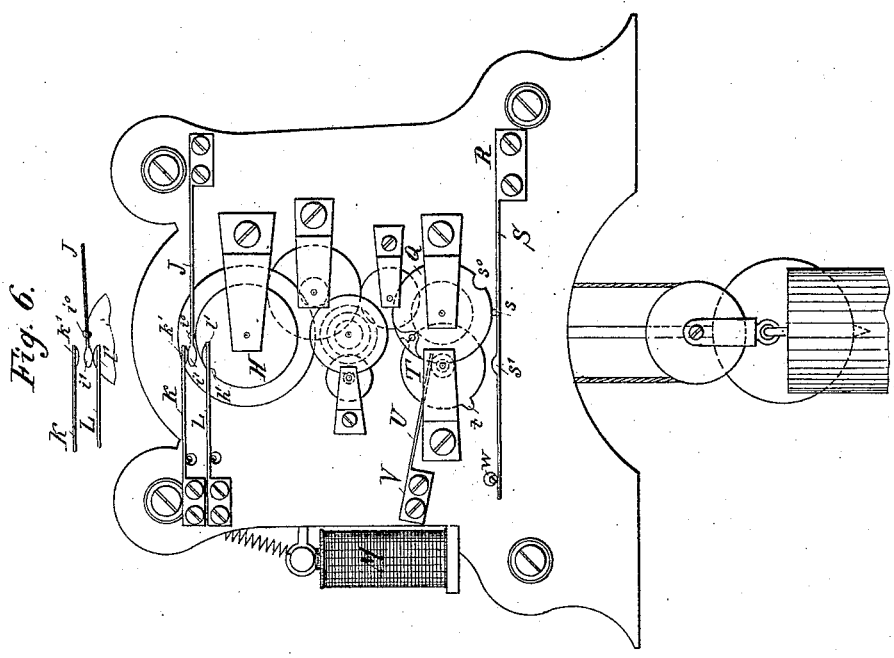
Figure 7:
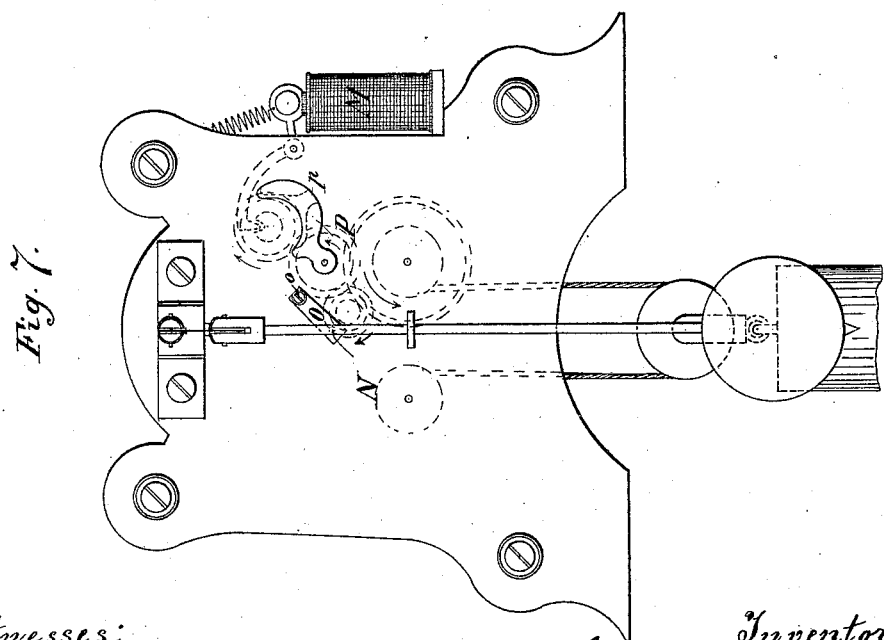

In the accompanying drawings, Figure 1 represents a side elevation, with parts broken away, of the motor for operating the switching apparatus of my improved electro-mechanical clock system. Fig. 1$^a$ is an end elevation of said motor. Fig. 1$^b$ is a detail plan of the water-supply cock and its operating mechanism. Fig. 2 is a plan of the motor and switching apparatus. Figs. 3, 4, and 5 are vertical transverse sections of the switching apparatus, showing the parts of the same on a larger scale. Figs. 6 and 7 are respectively a front elevation and a rear view of one of the clocks in my clock system, the dial being omitted in Fig. 6, so as to show the parts immediately below the same; and Fig. 8 is a diagram illustrating the general arrangement of my system for regulating clocks.

Similar letters of reference indicate corresponding parts.

My improved electro-mechanical system consists of the following parts: first, a switching apparatus located at the central station; secondly, a suitable motor for operating the same at suitable intervals of time; thirdly, a number of telegraphic, telephonic, fire-alarm or other circuits which are connected with the switching apparatus so as to switch the telegraphic, telephonic, or fire-alarm instruments out of circuit and switch in a corresponding number of clocks at the residences or offices of the subscribers, which clocks are provided with hand-setting devices that are actuated when the clocks are switched into said circuits.

The switching apparatus consists of a metallic cylinder C, the shaft G of which is supported in journal-bearings of standards D D. Parallel to the contact-cylinder C are supported plates E and F, of suitable insulating material, to which plates E and F are attached a number of contact-springs $a\ a$ and $b\ b$, which extend toward each other and form contact with each other at their inner overlapping ends $a'\ b'$. The contact-springs $a$ are connected with a battery or other source of electricity, and will be hereinafter termed "station contact-springs," while the contact-springs $b$ are connected to different circuits and will be referred to as "line contact-springs." The switching apparatus is interposed in a plurality of telephone, telegraph, or other circuits.

On the shaft G of the contact-cylinder C is arranged a platinum contact-pin $e$, which forms contact with a similar contact at the upper end of a spring X, that is connected to a binding-post and in circuit with a battery or other source of electricity, said battery having a direct ground-connection.

The contact-cylinder C has two longitudinal strips $cc$, of suitable insulating material, between which is arranged a platinum contact-strip $d$, which latter is in metallic connection with the contact-cylinder C, and thereby with the shaft G of the latter. When the contact-cylinder C is rotated, one of the insulating-strips $c$ comes in contact with the line contact-springs $bb$, which are thereby raised and separated from the station contact-springs $aa$. After this is accomplished the platinum contact-strip $d$ comes into metallic contact with the line contact-springs $bb$, as shown in Fig. 5. Immediately after the contact of the platinum strip $d$ with the line contact-strips is formed the contact-spring X forms contact with the pin $e$ on the shaft G, and causes thereby a current of electricity to be sent over all the line-wires. Immediately before the contact between the contact-strip $d$ and the line contact-springs $bb$ is interrupted the spring X breaks contact with the pin $e$, so that the breaking of the circuits does not take place on the contact-strip $d$, but at the contact-pin $e$ and on the spring X, which is in connection with the source of electricity. By this arrangement sparking is prevented at the points of contact of the platinum contact-strip $d$ with the line contact-springs, and the easy repairing of the contact-points on the shaft G and contact-spring permitted when they are worn out. Immediately after the platinum strip $d$ has passed the line contact-springs $b$ the latter form contact with the contact-strip $c$ on the other side of the platinum strip $d$ and produce by the inclined shape of said strip the gradual descent of the line contact-springs $b$ until their ends again form contact with the ends of the station contact-springs $a$, as shown in Fig. 4.

The contact-cylinder C is rotated by any suitable motor A, which may be actuated by hydraulic or mechanical means. The motor may be operated by a weight, which may be wound up from time to time by a hand-crank. The motor A is provided with a releasing mechanism that is operated by the armature $m'$ of an electro-magnet $m$, which armature when attracted causes the dropping of a lever $m^x$, that rests on a fork on the upper end of the armature-lever, said lever serving to actuate an arm $m^0$, that projects into the path of the fly of a train of gear-wheels, so as to withdraw it and permit the train of gear-wheels to be actuated in the usual manner by the drive-weight $M'$, so that motion is transmitted to the shaft G of the contact-cylinder C. A disk $n$, having a suitable projection $n'$, is located on the shaft of the contact-cylinder C and serves to return the lever into its normal position on the fork of the armature-lever, so as to lock the motor mechanism again, ready for the next operation. The electro-magnet M is placed into circuit with a suitable standard or master clock at the central station, which master clock closes a circuit, say, once in twenty-four hours, preferably in the morning hours, when the electric circuits are not in use, so as to produce thereby the release of the motor A, and by the operation of the switching apparatus the switching out of the instruments in said circuits and the switching in of the secondary clocks at the offices or residences of the subscribers.

When it is desired to wind up automatically the driving-weight of the motor A, this may be accomplished in a very effective and reliable manner by hydraulic means. The actuating-weight $M'$ of the motor A is suspended from a suitable chain, which passes over sprocket and guide wheels of the motor mechanism, and which is kept tight by a small counterbalancing-weight $M^2$. When the weight $M'$ arrives nearly at its lowest position, it presses on an anti-friction roller $h^2$ of the lever $h^2 i^2 o^2$, which is fulcrumed at $i^2$. With this lever is connected by means of the rod $l^2$ the lever $m^2 k^2 n^2$, which has its fulcrum at $k^2$. These double levers are balanced by means of weights applied at $o^2$ and $n^2$. When the weight $M'$ presses upon the roller $h^2$, the lever $h^2 i^2 o^2$ engages a pin $s^2$ of the elbow-lever $p^2 r^2 q^2$, which is fulcrumed at $r^2$ and provided at its end $q^2$ with a closed cylinder, in which rolls a heavy ball. The lever-arm $q^2 r^2$, which rests on the pin $u^2$, is brought by the lifting action of the lever $h^2 i^2 o^2$ gradually into a vertical position and finally beyond this position, so that the lever $q^2 r^2 p^2$ loses its balance and falls over toward pin $v^2$. By this means the pin $t^2$ of the lever $p^2 r^2$ has moved through an angle of ninety degrees and is engaged with an arm $x^2$ of a water-supply cock P', so as to open the latter, which on one side is in communication with a water-pipe $P^2$, by which water under pressure is supplied, and on the other side with a pipe $P^3$, which leads to a water-motor Q'. The latter rotates as soon as the cock P' is opened and winds up again the weight $M'$ by means of the transmitting-gearing $R' R^2$. (Shown in Fig. 1ª.) The spent water is conducted away from the motor Q' by the waste-pipe $P^4$. A short distance before the weight $M'$ has arrived in its highest position it presses against the roller $m^2$ and gradually lifts the lever $m^2 k^2 n^2$, the rod $l^2$, and the lever $h^2 i^2 o^2$, so that the arm $i^2 o^2$ engages the pin $t^2$ of the lever $p^2 r^2$ and moves the arm $q^2 r^2$ away from the pin $v^2$ and beyond its vertical position, so that by the weight in the cylinder of the arm $r^2 q^2$ the latter is moved over to and falls against the pin $u^2$, whereby the pin $s^2$ of the lever $p^2 r^2$ engages the arm $x^2$ and closes the cock P', as shown in Figs. 1ª and 1ᵇ. By this means the driving-weight of the motor is wound up again automatically for a longer time, so as to keep up the running of the motor.

By the switching apparatus described and the motor for intermittently operating the same it is possible to send from the main battery at the central station electrical impulses simultaneously through all the circuits of an existing net-work of electric wires, during which time the connection between the central office and the circuits is interrupted. In a net-work of telephonic wires, for instance, all the telephone-instruments would be switched out of connection with the central office, while the clocks would be switched into the circuits for a sufficient length of time to permit the setting of the hands of the same. This is accomplished in the following manner: Each clock is provided, in addition to the usual working parts, with a disk H, that is rotated on its axis once within a certain fixed period—say within twenty-four hours. This is accomplished by a suitable gear-wheel connection with the arbor of the hour-wheel. A line contact-spring J is connected with the telegraph, telephone, or other electric circuit and provided with an anti-friction roller $i^0$, which slides upon the periphery of the disk H, whereby the end $i'$ of the contact-spring J is held in raised position and in metallic contact with the end $k'$ of a second contact-spring K, which leads to the telegraphic, telephonic, or other electrical apparatus. In this manner a continuous electric circuit is formed over J, $i'$, $k'$, and K to the electrical apparatus in said circuit. The disk H is provided at a suitable point of its circumference with a recess or notch $h'$, which arrives below the anti-friction roller $i^0$ by the rotating motion of the disk H, and causes thereby the lowering of the contact-spring J, so that its end $i'$ will discontinue the contact with the end $k'$ of the contact-spring K and form contact with the end $l'$ of a contact-spring L, which latter is connected with an electro-magnet M, from which a wire runs to the ground. The arrival of the recess or notch K' below the roller $i^0$ is timed in such a manner that the electro-magnet M is switched into the line-circuit a short time before the switching apparatus at the central station is operated, it being continued in the circuit for a short time after the operation of the same is completed. In this manner the switching out of the electrical instrument at the residence or office of the subscriber is produced before the switching in of the clock takes place. When the switching apparatus at the central station and the clock are switched into the circuits, a current of electricity passes over the line and to the electro-magnet, so as to attract its armature and release thereby an ordinary train of gear-wheels, which when set in motion rotates by the action of the drive-weight of the clock the arbor of a hand-setting fork P. The armature of the electro-magnet M is applied to a fulcrumed and spring-actuated lever, the inner hook-shaped end of which engages a notched stop-disk, which is in gear with said train of gear-wheels, as shown in dotted lines in Fig. 7. As soon as the hook-shaped end of the armature-lever is lifted out of the notch of the stop-disk by the action of the electro-magnet M the train of gear-wheels is released and the fork P rotated by the same. When the stop-disk has completed its rotation, the hook-shaped lever drops again into the notch of the disk. The fork P is provided with segmental ribs or ledges at the side next to the clock and with a central recess $p$ between said ledges, so that the fork can engage a roller $o$ on a crank-arm O, which is keyed to the arbor of the hour-hand. The fork P, when rotated, produces thereby the setting of the hands into the correct position and moves by its recess $p$ beyond the roller $o$ until it is returned to its normal position, when the motion of the operating-train of gear-wheels is arrested in the usual manner. When it is desired to use the clock also as a standard or master clock for transmitting time-signals to an auxiliary system of electrical or other secondary clocks, the hour-wheel shaft or arbor is connected by a suitable gear-wheel transmission with the arbor of a second disk Q, the periphery of which is provided with one or more semicircular recesses $s^0$. Of these recesses those which are not used may be covered by a suitable plate, as shown in Fig. 6. The disk Q is by preference rotated at suitable intervals, so as to close the circuit of the central clock. A contact-spring S is applied to a binding-post R and connected with the circuit of the secondary clocks. The contact-spring S carries an anti-friction roller $s$, which when the disk Q is rotated drops into the recesses or recess $s^0$ as many times within an hour as required by the working of the secondary clocks in the circuit. This may be determined by uncovering a greater or smaller number of recesses $s^0$. A second contact-disk T, which is insulated from its shaft, is placed by its metallic hub in electrical connection with a contact-spring U, that is secured to a binding-clamp V. This disk T is provided on its periphery with a projecting nose $t$, which does not touch a contact $s'$ on the spring S when the contact-roller $s$ of the same is not in one of the notches $s^0$. As soon as the roller $s$ drops into one of the recesses $s^0$ the contact $s'$ of the spring S is in the path of the nose $t$ and forms contact therewith, so that a current of electricity may be sent at determined intervals of time from a suitable battery through the parts R, S, $s'$, $t$, T, U, and V to the circuit of the auxiliary clock system. An insulated eccentric $w$ is arranged near the outer end of the spring S for the purpose of adjusting the relative position of the latter toward the disks Q and T and produce the required contact of the roller $s$ and contact $s'$ with said disks, so as to insure thereby the proper functioning of the auxiliary clock system.

Having thus described my invention, I claim as new and desire to secure by Letters Patent—

1. The combination, with a number of subscribers' lines extending from a central office, of a switching apparatus at the central office, a motor for operating said switching apparatus, a releasing device for said motor, an electro-magnet located in the circuit of the master-clock and adapted to actuate said releasing device so as to start the motor, clocks at the residences or offices of the subscribers, devices on said clocks for switching them into the subscribers' lines, hand-setting devices on said clocks, and means for operating said hand-setting devices when the subscribers' clocks are switched into circuit with the main switching apparatus, substantially as set forth.

2. In an electro-mechanical clock system, a switching apparatus composed of a contact-cylinder provided with a longitudinal platinum strip and with an insulating-strip at each side of said platinum strip, station contact-wires, line contact-wires, said wires having contact-points at their overlapping ends, and a contact-spring forming contact with a pin on the shaft of the contact-cylinder, substantially as set forth.

3. The combination, with the switching apparatus and its motor, of a hydraulic device for winding up the motor, which consists of oscillating levers forming contact with the driving-weight of the motor, an elbow-shaped and weighted lever actuated by said fulcrumed levers, a water-supply pipe the cock of which is opened or closed by said elbow-lever, a water-wheel communicating with the cock of the water-supply pipe, and transmitting-gearing between the shaft of the water-wheel and the wheel-train of the motor, substantially as set forth.

4. In an electro-mechanical clock system, the combination of a clock having a notched contact-disk, contact-springs for switching said clock into or out of the line-circuit, an electro-magnet connected to one of said contact-springs, a hand-setting fork adapted to rotate when released by the armature-lever of the electro-magnet, and a crank-arm keyed to the arbor of the hour-hand and provided with an anti-friction roller, substantially as set forth.

5. In an electro-mechanical clock system, the combination, with a clock, of a rotating contact-disk Q, having notches $s^0$ in its circumference, a contact-spring S, adapted to drop intermittently into said notches, a second rotating contact-disk T, having a projecting nose $t$, and a second contact-spring V, placed in electrical contact with the hub of the disk T, said contact-springs Q and T being in the circuit of an auxiliary clock system, so as to actuate the clocks of the same, substantially as set forth.

In testimony whereof I have signed my name to this specification in the presence of two subscribing witnesses.

CARL ALBERT MAYRHOFER.

Witnesses:
GUSTAV HÜTSMANN,
B. ROI.